April 22, 1952     R. H. DAVIES     2,593,733
VALVE ASSEMBLY
Filed Oct. 16, 1944     2 SHEETS—SHEET 1
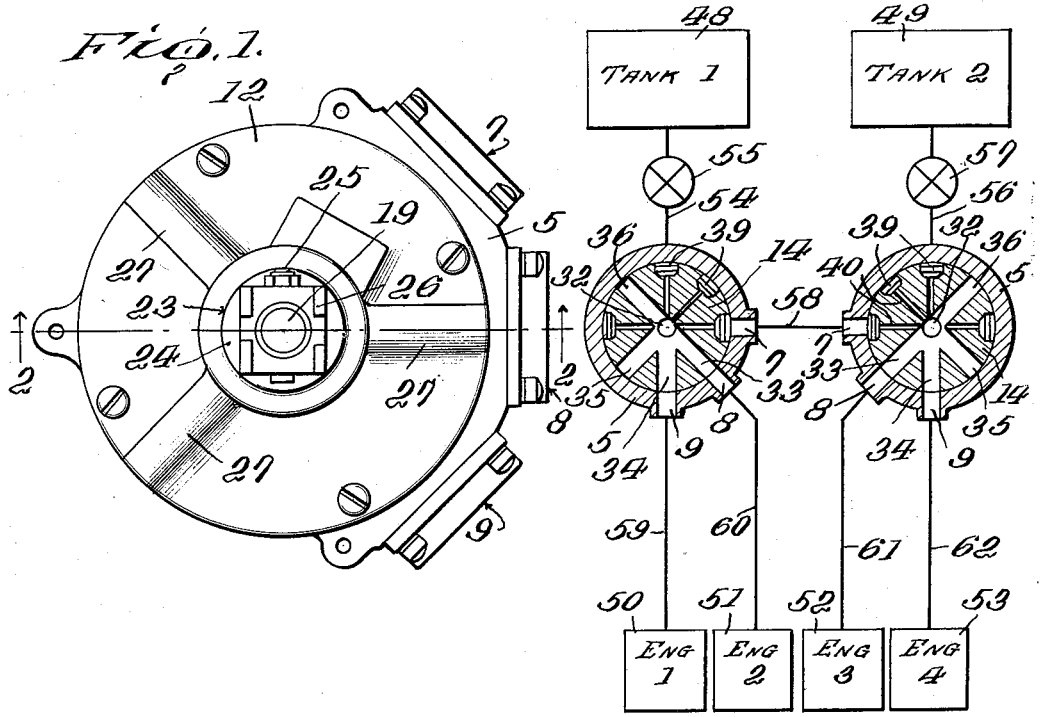
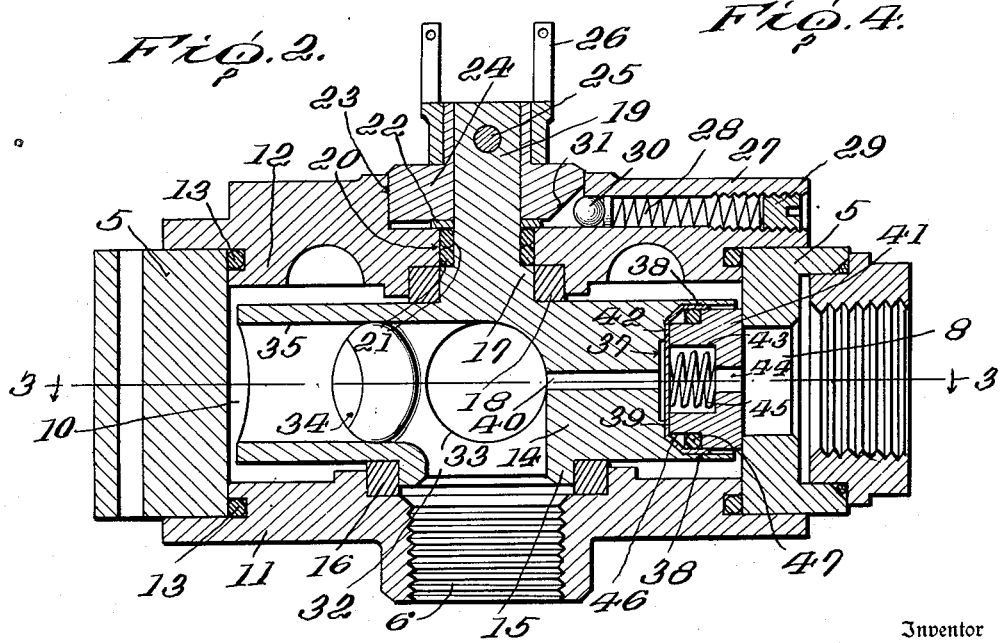
Inventor
Robert H. Davies
By Mason, Porter & Diller
Attorneys

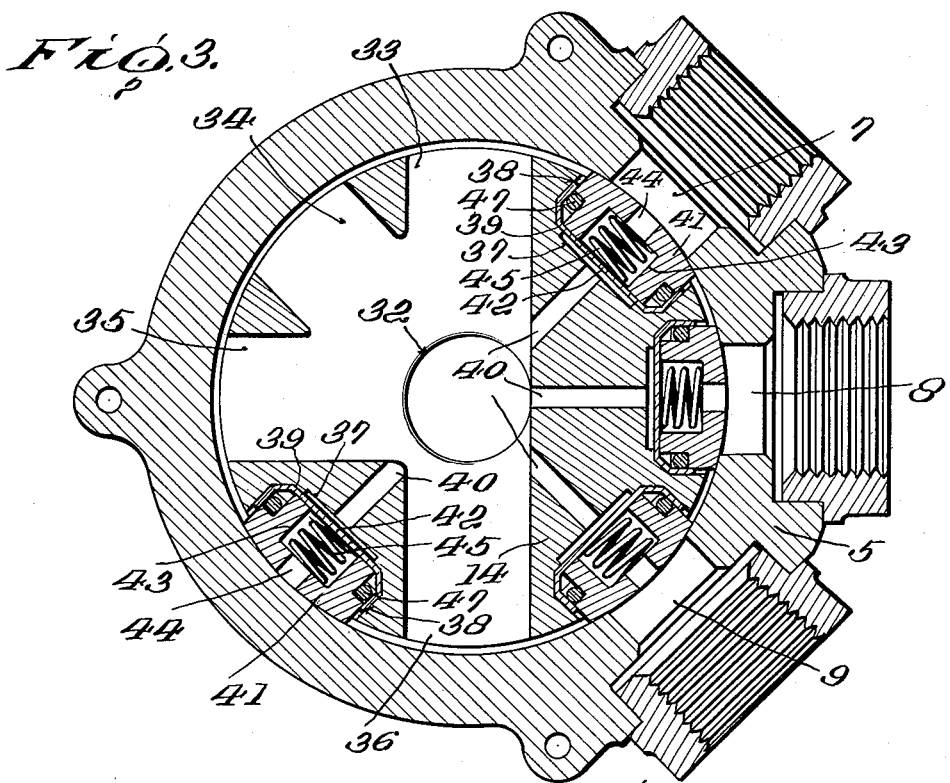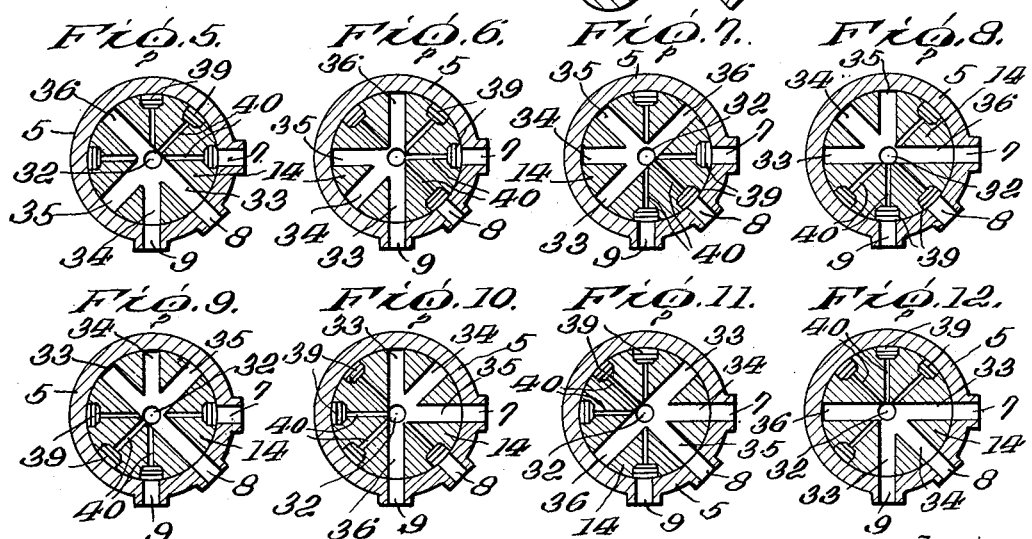

Patented Apr. 22, 1952

2,593,733

UNITED STATES PATENT OFFICE 2,593,733

VALVE ASSEMBLY

Robert H. Davies, Cleveland, Ohio, assignor to The Parker Appliance Company, Cleveland, Ohio, a corporation of Ohio Application October 16, 1944, Serial No. 558,784

1 Claim. (Cl. 251—105)

The invention relates generally to certain new and useful improvements in valve assemblies, and more particularly in valve assemblies of the type disclosed in my co-pending application for U. S. Letters Patent, Serial No. 531,938, filed April 20, 1944, now abandoned, and it primarily seeks to provide a novel valve assembly in which there is included a casing and a rotor movable in the casing, said casing and rotor having cooperating port equipments disposed in a novel manner for permitting placement of the rotor in eight distinct fluid distributing positions.

In the valve assembly of the co-pending patent application hereinabove referred to, casing and rotor port equipments are provided arranged to permit placement of the rotor in six fluid distributing positions, but one said position is a duplication of another of the six. It is an object of the invention to provide a valve assembly of the character stated wherein eight fluid distributing positions of the rotor are attainable, all eight being distinct fluid distributing positions without duplication of any position.

In its more detailed nature the invention resides in providing a valve assembly of the character stated including a casing having a single inlet port and three outlet ports, and a rotor movable within the casing and having a single inlet port constantly in registry with the casing inlet port and four outlet ports, said casing and rotor outlet ports being so cooperatively arranged that the casing inlet port can be brought into registry with any one, any two, all three, or none of the casing outlet ports, eight distinct control arrangements of the portings being possible, as aforesaid.

With the above and other objects in view that will hereinafter appear, the nature of the invention will be more clearly understood by reference to the following detailed description, the appended claim, and the several views illustrated in the accompanying drawings.

In the drawings:

Figure 1 is a plan view illustrating a valve assembly embodying the invention.

Figure 2 is a vertical cross section taken on the line 2—2 on Figure 1.

Figure 3 is a horizontal section taken on the line 3—3 on Figure 2.

Figure 4 is a diagrammatic horizontal sectional view illustrating one approved installation of the valve assembly structure, the latter being embodied in a system for selectively distributing fuel from two supply tanks to four engines or other places of use.

Figures 5 through 12 are somewhat diagrammatic horizontal sectional views illustrating eight distinct selective positions of the valve rotor.

In the example of embodiment of the invention herein disclosed, there are included a casing 5 having a single centrally and downwardly directed inlet port 6 and three laterally directed and radially opening discharge ports designated 7, 8 and 9 and arranged in equidistantly spaced relation 45° apart.

All of the casing ports 6, 7, 8 and 9 communicate with a cylindrical rotor chamber 10 which is closed at its lower end by a removably mounted cap 11 in which the inlet port 6 is formed, and at its upper end by a removably mounted cap 12. The caps 11 and 12 preferably are sealed by groove mounted packing rings 13 so as to seal the rotor chamber against leakage past the caps.

A rotor 14 is rotatably mounted in the casing chamber 10 and is equipped with a bottom hub 15 which is rotatable in a non-metallic bearing ring 16 mounted in the bottom cap 11 in the manner best illustrated in Figure 2. At its upper end the rotor is provided with a smaller hub 17 which is rotatable in a non-metallic bearing ring 18 carried by the cap 12. The rotor is also provided with a reduced diameter stem 19 which extends upwardly from the hub 17 through a bore 20 in the cap 12. Within the cap bore 20 the stem 19 is surrounded by sealing rings 21 which are retained in the bore by a ring 22, as shown in Figure 2, said ring being mounted in a counterbore 23 formed in the cap 12.

A head 24 is pin-secured as at 25 on the rotor stem 19, and it should be observed by reference to Figures 1 and 2 of the drawings that the head 24 is rotatable in the cap counterbore 23 and has a yoke 26 or other rotor turning member secured thereon through the medium of the same pin 25 which secures the head to the rotor stem. The cap 12 is equipped with three raised ribs 27 which extend radially with respect to the axis of the stem 19 and head 24, one said rib being disposed over the centrally located outlet port 8 and one said rib being disposed at an angle of 45° at each side of an extension of the center of the first mentioned rib at the opposite side of the cap 12. Each rib 27 is equipped with a bore 28 which is closed at its outer end by a screw plug 29. In each rib bore 28 is located a spring pressed ball detent 30 which is engageable with one of eight equidistantly spaced recesses 31 formed in the head 24. Each of the recesses 31 corresponds to one index station or port placement position of the rotor 14, and it will be obvious that engagement of the yieldable detents 30 in the recesses serves to yieldably retain the rotor in its various positions of adjustment. The particular number and arrangement of detents herein disclosed is considered advantageous since it provides a balanced pressure against the valve rotor without providing excessive resistance to turning of the rotor.

The rotor 14 is provided with one downwardly extending inlet port 32 which constantly registers with the casing inlet port 6 in the manner clearly illustrated in Figures 2 and 3 of the drawings. The rotor also is equipped with three laterally directed, radially opening outlet ports 33, 34 and 35 which are arranged in a group and equidistantly spaced 45° apart, and with a fourth port 36 which forms an axial extension on one of the outside rotor ports at one side of the group of three. See Figure 3. In other words, the fourth rotor port 36 is spaced 180° from the next adjacent rotor port in one direction about the periphery of the rotor, and 90° from the next adjacent rotor port in the opposite direction about the periphery of the rotor.

At each one-eighth station or 45° position about the rotor periphery not occupied by one of the ports 33, 34, 35 or 36, the rotor is equipped with a recess bore 37 and a counterbore 38 in which to receive a sealing unit generally designated 39, said sealing unit being designed to engage over casing ports with which rotor ports are out of registry so as to seal off said non-registered ports. It will also be apparent by reference to Figures 2 and 3 of the drawings that a pressure duct 40 communicates between the rotor inlet port 32 and each of the sealing unit recesses 37. Any approved form of sealing unit may be mounted in the rotor recesses, and an example of an acceptable form of sealing unit is disclosed in the co-pending application for U. S. Letters Patent Serial No. 516,269 filed by Donald Stark on December 30, 1943, which matured into Patent No. 2,371,657 on March 20, 1945.

In the form of sealing unit herein disclosed there is included a non-metallic sealing disc 41 which is movably contained within a cup-like metal shell 42. Each disc 41 is provided with an enlarged chamber 43 and a pressure port leading into said chamber from the outer surface of the disk, a compression spring 45 being mounted in said chamber and constantly tending to press the disc against the opposing surface of the rotor chamber 10 in the casing. An annular recess 46 is formed about the inner portion of each disc 41, and a sealing ring 47 is interposed between the disc and the respective shell 42 in said recess. It will be obvious by reference to Figures 2 and 3 of the drawings that whenever pressure is dominant in a given casing outlet port, said pressure will act in the chamber 43 of the sealing unit overlying that port to press the unit disc 41 in tight sealing contact with the interior of the rotor chamber 10, and when pressure within the rotor is dominant it will act through the ducts 40 and against the shells 42 to press the units as a whole against the interior of the rotor chamber 10.

In Figure 4 of the drawing is diagrammatically illustrated one approved installation of valve assembly in which provision is made for selectively distributing fuel from two supply tanks to four engines or other places of use. In this diagrammatic illustration the two supply tanks are designated 48 and 49 respectively, and the four engines or other use points are designated 50, 51, 52 and 53 respectively. The tank 48 is connected by a supply line 54 with the inlet port of one valve assembly, said line having a shut-off valve 55 connected therein, and the other tank 49 is connected by a supply line 56 with the inlet port of a second valve assembly, and the supply line 56 also is provided with a shut-off valve 57. The two valve assemblies have the outlet ports 7 thereof connected by a cross-over duct 58. The outlet ports 8 and 9 of the first mentioned valve assembly are connected by ducts 60 and 59 with the engines 50 and 51, and the second mentioned valve assembly has its outlet ports 8 and 9 connected by ducts 61 and 62 with the engines 52 and 53.

In Figures 5 through 12 there are illustrated eight distinct selective positions of the valve rotor. In Figure 5 the valve rotor is turned to a position in which fluid can be supplied through the casing ports 8 and 9. In Figure 6 the valve rotor is turned to a position in which fluid can be distributed through the casing port 9, alone. In Figure 7 the valve rotor is turned to a position in which the supply of fluid to all of the outlet ports 7, 8 and 9 is cut off. In Figure 8 the valve rotor is turned to a position in which fluid can be distributed through the casing outlet port 7, alone. In Figure 9 the valve rotor is turned to a position in which fluid can be distributed through the casing outlet port 8, alone. In Figure 10 the valve rotor is turned to a position in which fluid can be distributed through the casing outlet ports 7 and 9. In Figure 11 the valve rotor is turned to a position in which fluid can be distributed through the casing outlet ports 7 and 8 and in Figure 12 the valve rotor is turned to a position in which fluid can be distributed through all three casing outlet ports 7, 8 and 9.

While one form of the invention has been shown for purposes of illustration, it is to be clearly understood that various changes in the details of construction and arrangement of parts may be made without departing from the spirit and scope of the invention as defined in the appended claim.

I claim:

In a valve assembly, a casing, a rotor rotatably mounted in the casing, said casing and said rotor each having an inlet port and said inlet ports being arranged axially for constant registry one with the other, said casing also having three radially opening outlet ports arranged in equidistantly spaced relation 45° apart, and said rotor also having four radially opening outlet ports for communicating with said inlet ports and three of which are arranged in a group in equidistantly spaced arrangement 45° apart and the fourth rotor outlet port is spaced 180° from the next adjacent rotor port in one direction about the periphery of the rotor and 90° from the next adjacent rotor port in the opposite direction about the periphery of the rotor, whereby said ports are effective upon selective rotation of the rotor to enable the registering of said inlet ports with any one, any two, all three, or none of the casing outlet ports, said port registration selections being effective in eight separate and distinct combinations selective by eight distinct position movements of the rotor each a distance of 45° and without duplication of any rotor position in the selection of said eight combinations, and said rotor having a peripheral recess therein at each 45° position not occupied by an outlet port in the plane in which the four outlet ports are located, a port sealing unit in each said recess having a pressure area approximately that of each outlet port, and a pressure duct leading from the rotor inlet port into each said recess.

ROBERT H. DAVIES.

REFERENCES CITED

The following references are of record in the file of this patent:

UNITED STATES PATENTS

| Number | Name | Date |
| --- | --- | --- |
| 694,328 | Seley | Feb. 25, 1902 |
| 1,366,862 | Berry | Jan. 25, 1921 |
| 2,042,186 | Peterson | May 26, 1936 |
| 2,165,096 | Frechette | July 4, 1939 |
| 2,356,786 | Harmon | Aug. 29, 1944 |
| 2,414,451 | Christensen | June 21, 1947 |

FOREIGN PATENTS

| Number | Country | Date |
| --- | --- | --- |
| 159,992 | Great Britain | of 1921 |